US005528980A

United States Patent [19]
McClean

[11] Patent Number: 5,528,980
[45] Date of Patent: Jun. 25, 1996

[54] ELECTRIC TOASTER

[75] Inventor: John W. McClean, Lakemba, Australia

[73] Assignee: Breville R & D Pty Ltd., New South Wales, Australia

[21] Appl. No.: 105,716

[22] Filed: Aug. 12, 1993

[30] Foreign Application Priority Data

Aug. 25, 1992 [AU] Australia ................................. PL4331

[51] Int. Cl.⁶ .................................................. A47J 37/08
[52] U.S. Cl. .................................. 99/389; 99/385; 99/391
[58] Field of Search ............................. 99/389, 391, 393, 99/394, 385, 359, 339, 399, 392

[56] References Cited

U.S. PATENT DOCUMENTS

| | | | |
|---|---|---|---|
| 2,320,951 | 6/1943 | Russell | 99/389 |
| 3,659,518 | 5/1972 | Porter | 99/391 |
| 3,760,713 | 9/1973 | Sato | 99/391 |
| 3,789,749 | 2/1974 | Paaskesen | 99/391 |
| 4,254,695 | 3/1981 | Landry | 99/391 |
| 4,397,227 | 8/1983 | Landry | 99/391 |
| 4,404,899 | 9/1983 | Weiss | 99/391 |
| 5,181,455 | 1/1993 | Masel et al. | 99/389 |
| 5,216,944 | 6/1993 | Trujillo | 99/389 |

FOREIGN PATENT DOCUMENTS

| | | |
|---|---|---|
| 157490 | 3/1948 | Australia . |
| 252770 | 7/1964 | Australia . |
| 439876 | 9/1973 | Australia . |

*Primary Examiner*—David A. Scherbel
*Assistant Examiner*—Patrick F. Brinson
*Attorney, Agent, or Firm*—Michael J. Striker

[57] ABSTRACT

The pop-up toaster has a toaster body provided with a slot for insertion of an article to be toasted, a toaster carriage for the article, electric toasting elements in an interior of the toaster body for toasting the article and a flame barrier device for preventing a flame produced by inadvertent combustion of the article from issuing from the slot while permitting escape of heated air from the slot. The flame barrier device can be made of wire gauze or expanded metal and is connectable to the toaster body for motion between a closed position closing the slot to prevent flame from issuing therefrom and at least one open position in which the article can be inserted into the interior through the slot. The flame barrier device can be connected to the toaster carriage so that it automatically closes when the article to be toasted is inserted in the toaster and automatically opens when the article has been toasted.

10 Claims, 6 Drawing Sheets

ELECTRIC TOASTER

BACKGROUND OF THE INVENTION

The present invention relates to electric toasters and more particularly to electric toasters in which the article, for example, a slice of bread, to be toasted is inserted through a slot in the top of the toaster to lie between two heating elements which when energized toast both sides of the slice at the same time. Such toasters are normally equipped with electromechanical means that act to raise or eject the slice of bread and switch off the toaster once the toasting operation has been completed. Such toasters are for this reason commonly known as "pop-up" toasters and for convenience this term is used in this specification.

While millions of such toasters are in use and generally prove satisfactory there have been a significant number of cases in which fires have been caused by the article being toasted becoming stuck, for one reason or another, in the toaster with the result that the electrical supply to the heating elements is not switched off automatically and the toaster commences first of all to char and thereafter to ignite the article being toasted with the production of a considerable amount of flame. In some cases, where a toaster has been placed beneath the bottom of a window curtain, the flames have ignited the curtain and caused a serious conflagration.

SUMMARY OF THE INVENTION

The object of the present invention is to provide a means pop-up toaster of the above-described type having for protecting against the occurrence of fires which are caused by an article being toasted becoming stuck in the toaster.

According to the invention, the pop-up toaster has a toaster body provided with a slot for insertion of an article to be toasted, a toaster carriage for the article, electric toasting elements in an interior of the toaster body which toast the article, and flame barrier means comprising a wire gauze or expanded metal member for preventing a flame produced by inadvertent combustion of the article from issuing from the slot while permitting escape of heated air from the slot. The flame barrier means is pivotally connected to the toaster body for motion between a closed position closing the slot to prevent flame from issuing from the toaster and at least one open position in which the article can be inserted into the interior through the slot.

In a preferred embodiment of the invention means for automatically moving the flame barrier means into the closed position when the article is inserted into the toaster through the slot and into the at least one open position after the article has been toasted and is to be taken from the slot. Advantageously the flame barrier means is pivotally connected to the toaster carriage by a connecting rod to provide the means for automatically moving the flame barrier means.

BRIEF DESCRIPTION OF THE DRAWING

In order that the nature of the invention may be better understood, preferred embodiments thereof are hereinafter described, by way of example, with reference to the accompanying drawings, in which.

DESCRIPTION OF THE PREFERRED EMBODIMENTS

Figure 1:
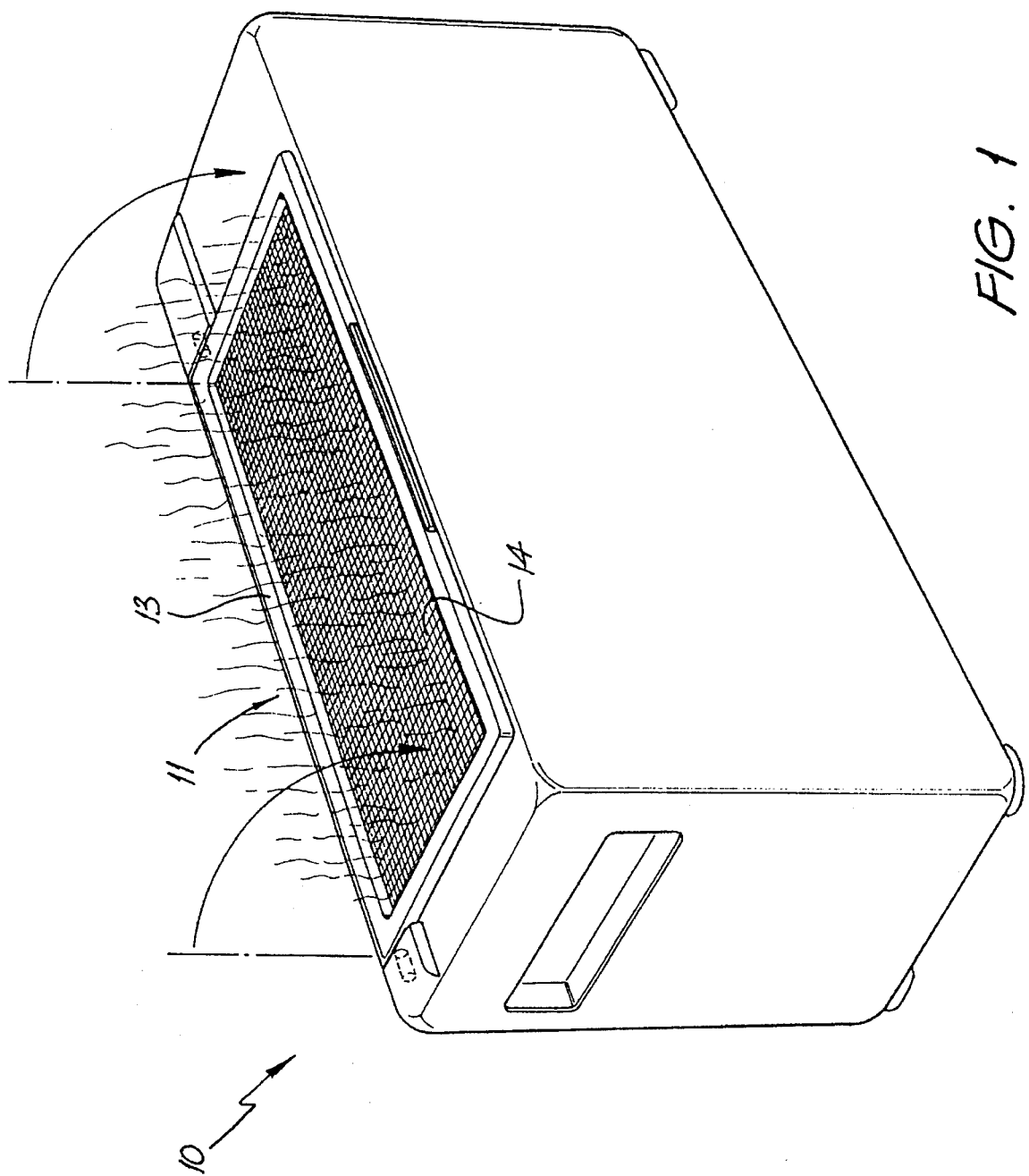
FIG. 1 is a perspective view of one embodiment of the invention including a manually operated wire mesh baffle.
Figure 2:
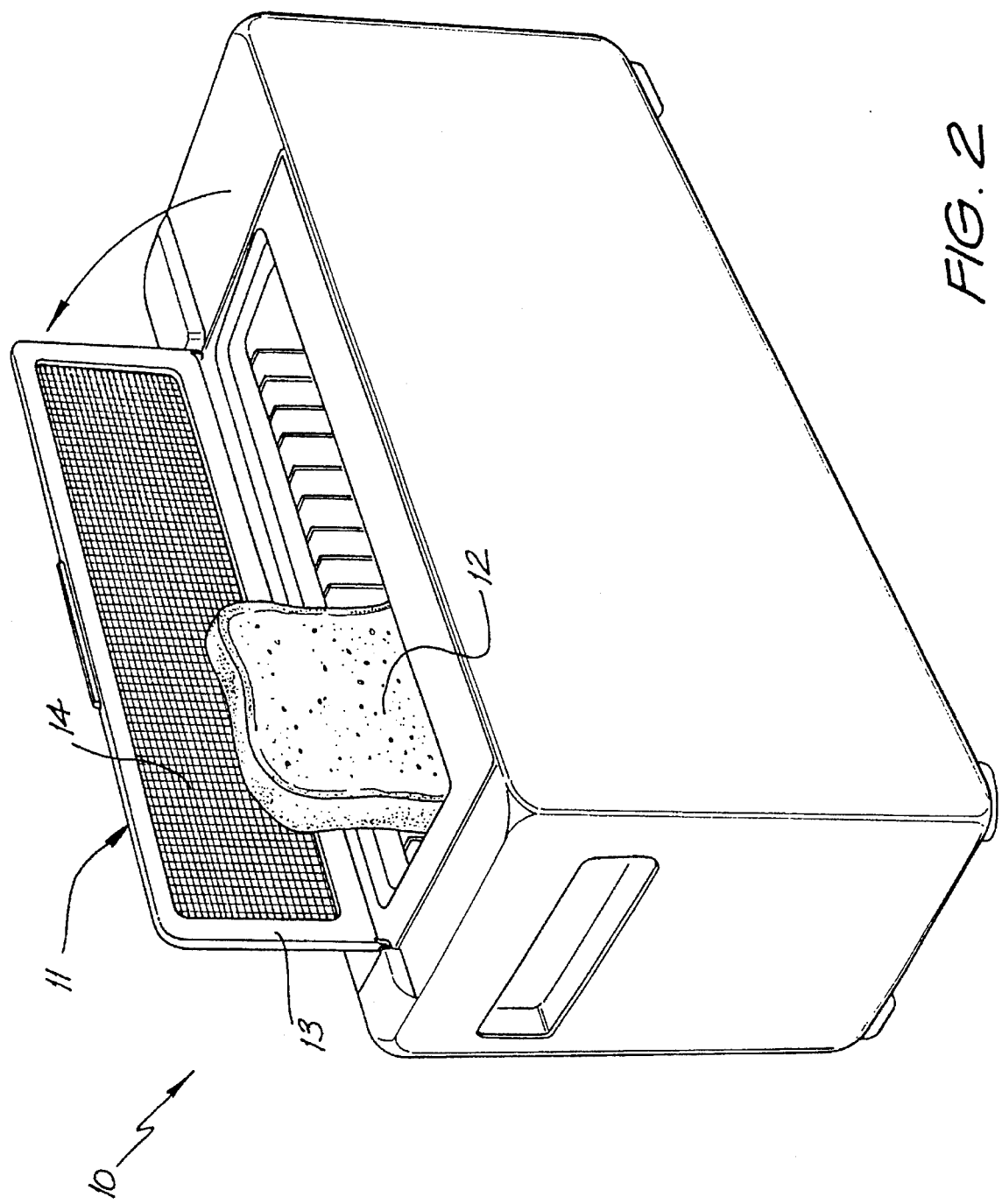
FIG. 2 is a perspective view of the toaster shown in FIG. 1 in which the wire mesh baffle is raised for the insertion and removal of toasted material.

FIGS. 1, 2 illustrate one embodiment of the invention in which a pop-up toaster 10 of generally conventional construction which is provided with a hingedly or pivotally attached wire mesh baffle 11. For inserting or removing a slice of bread 12 the baffle 11 is pivoted upwardly into an open position as shown in FIG. 2 by hand. During toasting the baffle 11 is lowered to the closed protective position shown in FIG. 1. The baffle 11 consists of a frame 13 that carries a wire mesh member 14 and is pivotally attached to the body of the toaster at pivots 30, 31 at opposite ends of the frame 13. Each of these pivots 30, 31 includes a corner plate 35 having a cylindrical blind hole 32 in which a prong 33 (shown in FIG. 3) engages so that the wire mesh baffle 11 is pivotable.

Figure 3:
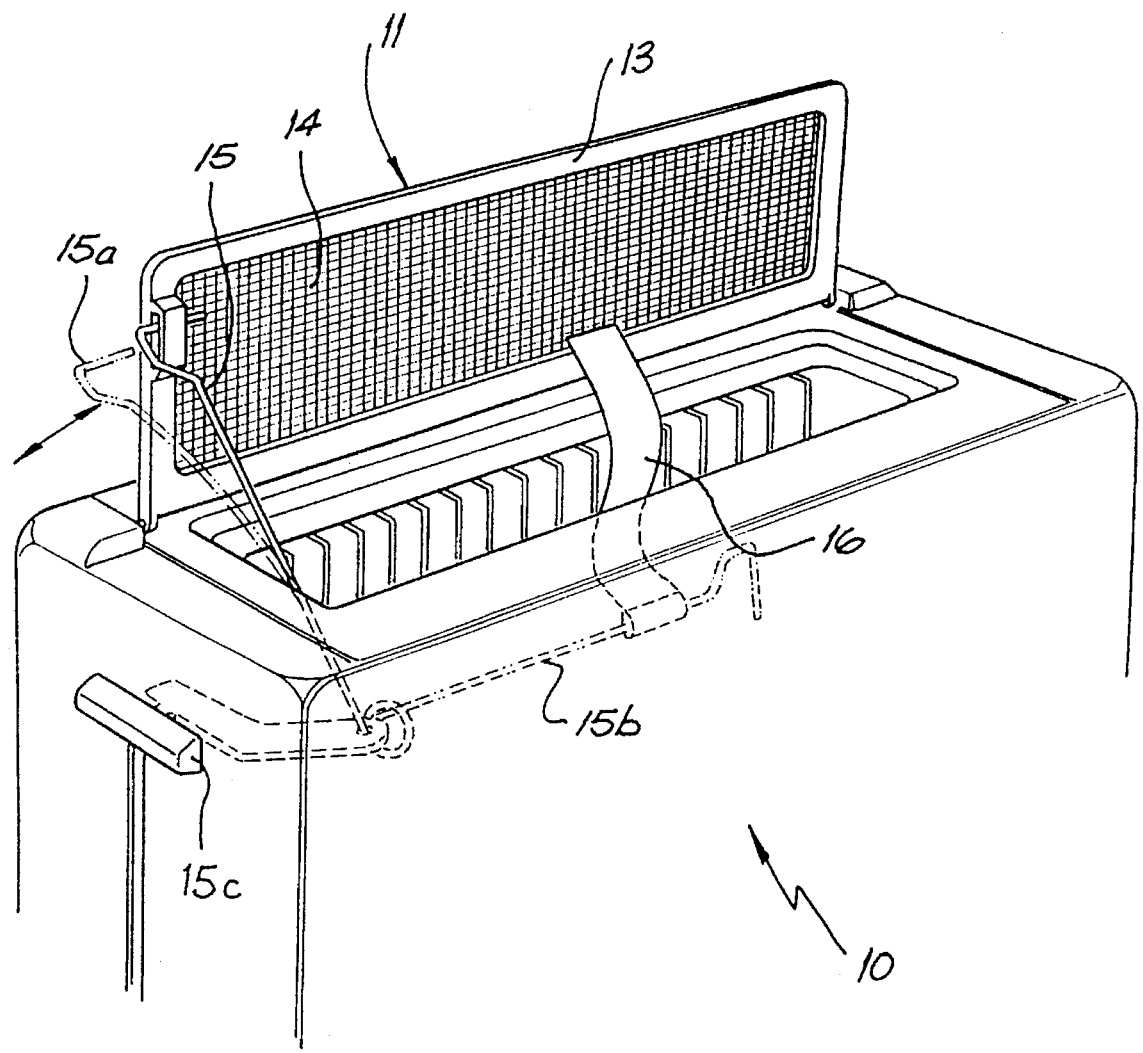
FIG. 3 is a perspective view of another embodiment of the toaster according to the invention.

In the modified embodiment shown in FIG. 3 the frame 13 is supported by a stay 15 connected to the conventional toast carriage (a portion 41 of the carriage being shown in FIG. 3) which is depressed by an external lever 15c. When the external lever 15c is depressed the stay 15 automatically closes the frame 13 to bring it to the position shown in FIG. 1. When toasting is completed the toast carriage and the external lever 15c rises under the action of an internal spring and acts through the stay 15 to pivot the frame 13 to the position shown.

As is it not possible to pack the toaster in the configuration shown in FIG. 3 it is necessary to make the stay 15 capable of detachment from the frame 13 and be able to fold from the broken line position 15a to the position 15b. The stay 15 is provided with a hook 15' on its free end which engages or disengages from an eye 15" on the frame for the aforementioned purpose. When first sold the toaster includes a message 16 instructing a user to engage the stay 15 with the frame 13 before using the toaster. This is removed and discarded after being read.

Experiments have shown that with such an arrangement if a fire occurs within the toaster flames cannot escape through the wire mesh. The principles involved in this are well known and are exhibited by the classic "Davy" lamp.

Figure 4:
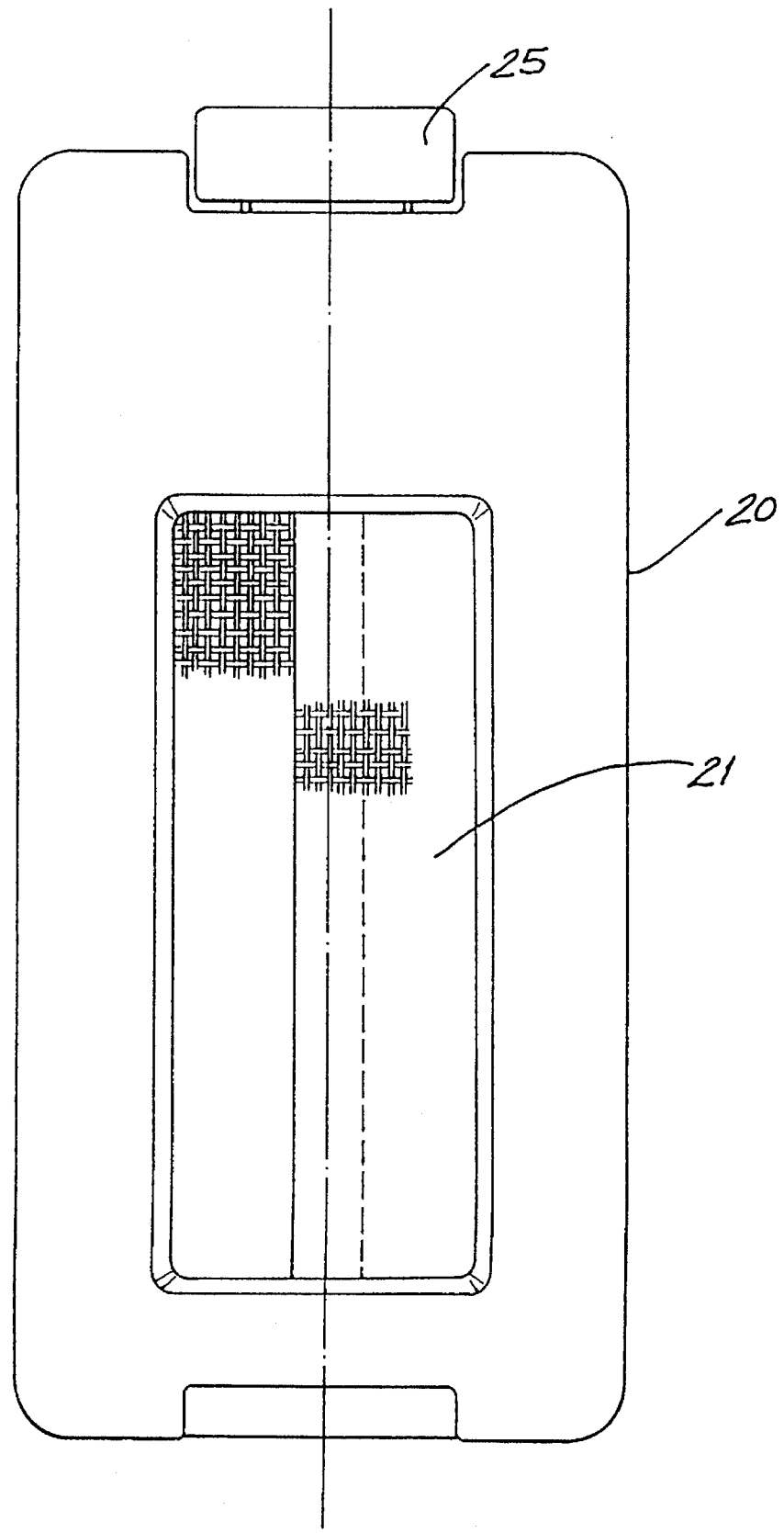
FIG. 4 is a plan view of another embodiment of the invention.
Figure 5:
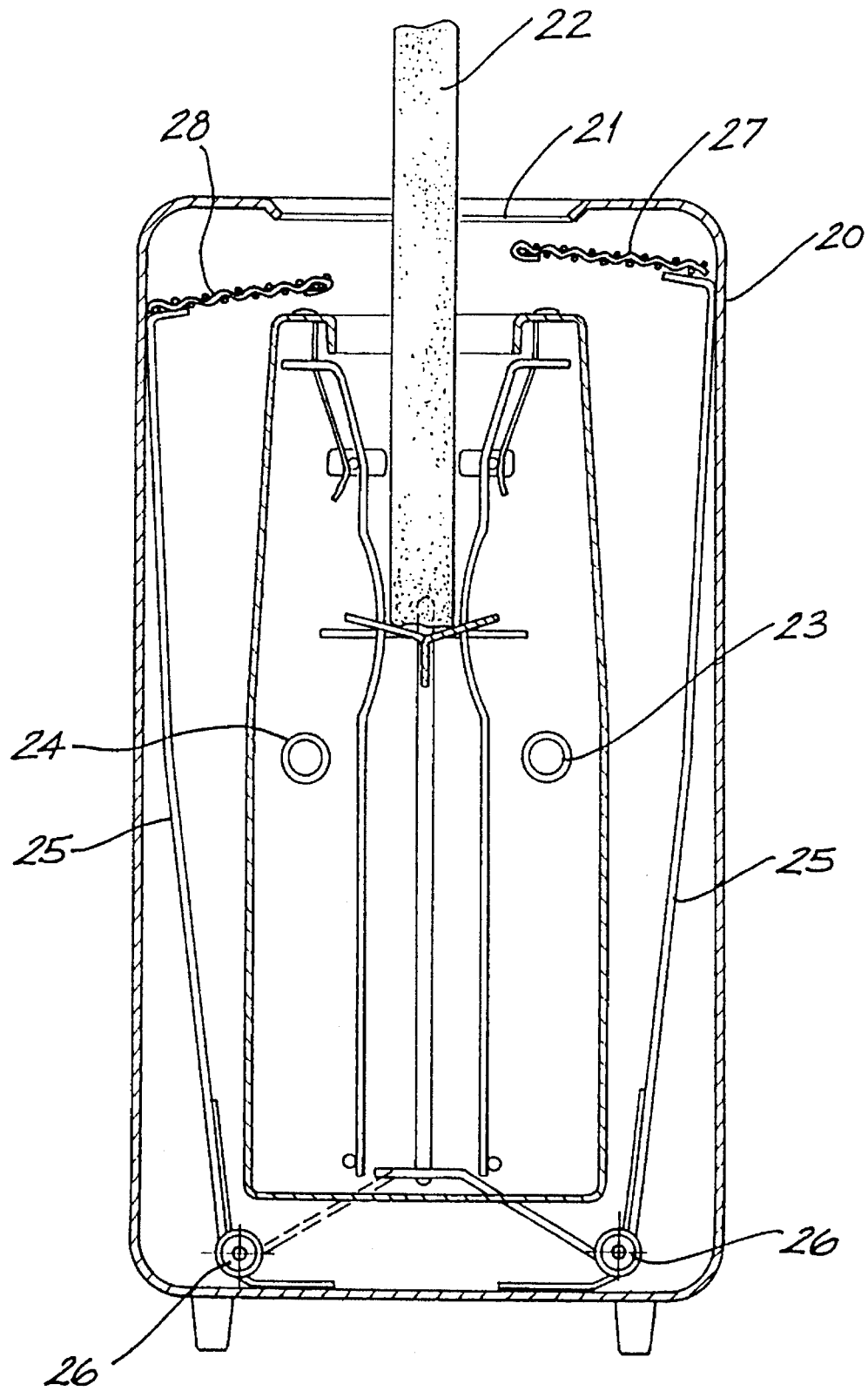
FIG. 5 is a cross-sectional view of the toaster shown in FIG. 4 showing the arrangement of parts during the insertion of a slice of bread.
Figure 6:
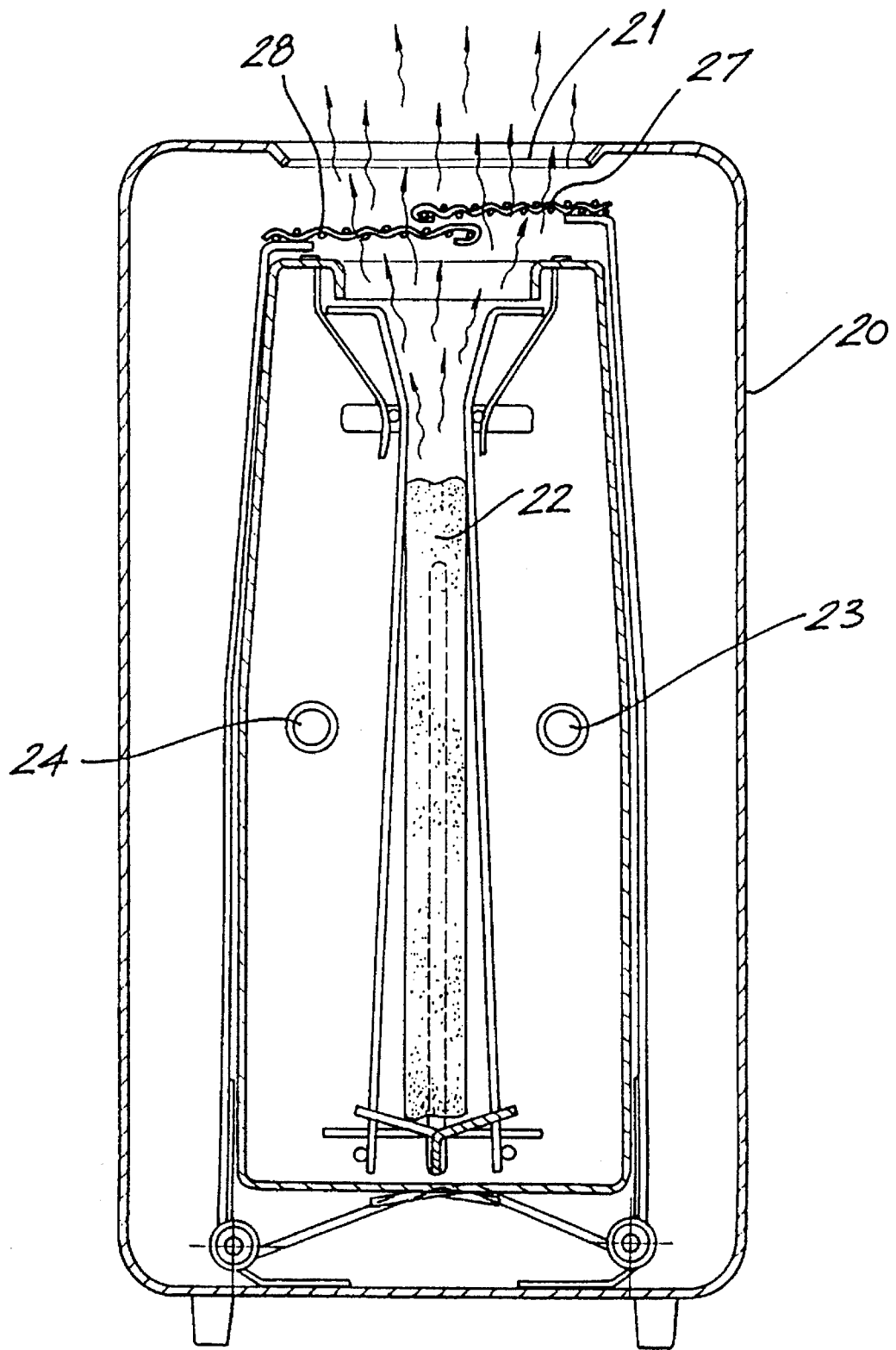
FIG. 6 is a view similar to FIG. 5 showing the configuration of the parts of the toaster during toasting.

In FIGS. 4, 5 and 6 is shown an additional embodiment of a pop-up toaster according to the invention. The toaster consists of a casing or toaster body 20 having in its upper surface a slot 21 through which material to be toasted, such as the slice of bread 22, shown in FIG. 5. The toaster contains a conventional mechanism for lowering the bread 22 so as to lie between the heater elements 23 and 24. This is controlled by the lever 25 (FIG. 4). The toaster also includes conventional electromechanical devices controlling the "pop-up" function of the toaster which, for clarity have been omitted. At each side of the interior of the casing 20 an arm 25 is pivotable about pivot point 26 and outwardly spring loaded by springs 44. These arms carry at their upper ends pieces of metal wire mesh adapted to act as flame baffles 27 and 28 which normally assume the position shown in FIG. 5 thus leaving the slot 21 and the area beneath it clear for the insertion of an article to be toasted. If, however, the slice of bread 22 is lowered depressing the lever 25 to take up position shown in FIG. 6 the metal wire mesh flame baffles 27 and 28 are brought to a position in which they overlap on the center line of the toaster and completely close off the area above the slice of bread 22 being toasted. Once the normal toasting operation has finished the arms 25 are automatically restored to the position shown in FIG. 5 and the piece of toast produced is elevated to the position shown in that figure.

The effect of the arrangement is to prevent any flames from combustion of material in the toaster from extending upwardly above the level of the metal wire flame baffles. These baffles may be made not only from wire mesh but from a variety of other materials that are capable of withstanding the temperature involved, allow the escape of heat and air during toasting that are effective to prevent passage of flame through them.

It is to be understood that the embodiments of the invention described and illustrated are given by way of example only as constituting particular forms of the invention as defined broadly above.

I claim:

1. Pop-up toaster comprising a toaster body provided with a slot for insertion of an article to be toasted, a toaster carriage for raising and lowering said article to be toasted and heating means in an interior of said toaster body for toasting said article and flame barrier means for preventing a flame produced by combustion of a portion of said article being toasted in said interior from issuing from said slot and for permitting escape of heated air from said slot, said flame barrier means being movable between a closed position closing said slot to prevent said flame from issuing therefrom and at least one open position in which said article can be inserted into said interior of said toaster body through said slot.

2. Pop-up toaster as defined in claim 1, wherein said flame barrier means consists of a frame and a sheet of a member permeable to said heated air held in said frame, and wherein said frame is pivotally mounted on said toaster body, is positioned and is of a size so that said sheet covers said slot when said flame barrier means is in said closed position and so that said flame barrier means is pivotable from said closed position into said at least one open position.

3. Pop-up toaster as defined in claim 2, wherein said member comprises expanded metal.

4. Pop-up toaster as defined in claim 2, wherein said member comprises a wire gauze.

5. Pop-up toaster as defined in claim 2, further comprising means for automatically moving said flame barrier means into said closed position when said article is inserted in said toaster for toasting and for automatically moving said flame barrier means into said at least one open position after said toasting of said article has ended.

6. Pop-up toaster as defined in claim 5, wherein said means for automatically moving said flame barrier means comprises a connecting element pivotally connecting a portion of said toaster carriage to said frame so that said flame barrier means is moved between said closed position and said at least one open position as said toaster carriage moves upward and downward.

7. Pop-up toaster as defined in claim 6, wherein said pivotable connecting element is detachable from said frame and foldable into a position parallel to a top surface of said toaster body for shipping and storage.

8. Pop-up toaster as defined in claim 1, further comprising means for automatically moving said flame barrier means between said closed position and said at least one open position, and wherein said flame barrier means comprises portions of metal wire mesh in said interior adjacent said slot and said means for automatically moving said flame barrier means includes a pair of levers in said interior of said toaster body positioned on opposite sides of said toaster carriage and said slot, said levers being pivotally mounted in a lower portion of said toaster body and extending upwardly toward said slot and having said portions of said metal wire mesh attached to upper ends of said levers, and wherein said levers are spring loaded so as to be urged outwardly so that said article can be inserted through said slot and between said portions of said wire mesh into said interior and said levers are pivotally connected to said toaster carriage so that, when said toaster carriage is moved downward with said article, said levers are forced inwardly so said article is covered by said portions of said metal wire mesh and said slot is closed to prevent a flame generated by combustion of said article from issuing from said slot.

9. Pop-up toaster comprising a toaster body provided with a slot for insertion of an article to be toasted, a toaster carriage for raising and lowering said article to be toasted, heating means for toasting said article in an interior of said toaster body and a substantially flat metal member provided with a plurality of throughgoing holes, wherein said substantially flat metal member is movable between a closed position covering said slot and at least one open position in which said article can be inserted into said interior of said toaster body through said slot and wherein said flat metal plate with said holes is constructed such that heated air can pass through said slot and flat metal member but a flame cannot issue from said slot and flat metal member when said flat metal member is in said closed position covering said slot.

10. Pop-up toaster as defined in claim 9, wherein said substantially flat metal member having said throughgoing holes consists of a frame and a sheet of wire gauze held in said frame, said wire gauze being permeable to said heated air.

* * * * *